US012785965B2

(12) United States Patent
Stange

(10) Patent No.: US 12,785,965 B2
(45) Date of Patent: Nov. 3, 2026

(54) PLATFORM FOR CREATING AND USING A HYBRID NON-FUNGIBLE TOKEN BLOCKCHAIN SYSTEM

(71) Applicant: James Paul Stange, The Villages, FL (US)

(72) Inventor: James Paul Stange, The Villages, FL (US)

( * ) Notice: Subject to any disclaimer, the term of this patent is extended or adjusted under 35 U.S.C. 154(b) by 249 days.

(21) Appl. No.: 18/224,472

(22) Filed: Jul. 20, 2023

(65) Prior Publication Data

US 2025/0030546 A1 Jan. 23, 2025

(51) Int. Cl.

| | |
|---|---|
| ***H04L 29/06*** | (2006.01) |
| ***H04L 9/00*** | (2022.01) |
| ***H04L 9/06*** | (2006.01) |
| ***H04L 9/32*** | (2006.01) |

(52) U.S. Cl.

CPC .......... *H04L 9/3213* (2013.01); *H04L 9/0643* (2013.01); *H04L 9/3268* (2013.01); *H04L 9/50* (2022.05)

(58) Field of Classification Search

CPC .. G06F 21/62; G06F 21/6209; G06F 21/6218; G06F 21/6227; G06F 21/64; G06F 16/1824; G06F 21/44; G06F 21/629; G06F 16/2379; G06F 16/9027; G06F 21/16; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; H04L 9/3213; H04L 9/50; H04L 9/3268; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583

See application file for complete search history.

(56) References Cited

U.S. PATENT DOCUMENTS

| | | | | |
|---|---|---|---|---|
| 11,182,467 | B1 | 11/2021 | Medina | |
| 11,301,460 | B2 | 4/2022 | Rich et al. | |
| 12,182,204 | B2 | 12/2024 | Tran et al. | |
| 2015/0205975 | A1 * | 7/2015 | Agrawal ................ | G06F 21/10 713/189 |

(Continued)

OTHER PUBLICATIONS

Hacker Lexicon: What is Stegaography, Lily Hay Newman, Security, 9 Page(s), Jun. 26, 2017.

(Continued)

*Primary Examiner* — Malcolm Cribbs

(57) ABSTRACT

A computer program product, computerized method, and system for generating a Hybrid Non-Fungible Token and using a Hybrid Non-Fungible Token to confirm an identity during an electronic transaction. The Hybrid Non-Fungible Token containing Forensic Data which will include at least one of the following; unique biometric data, unique state issued identifying documents or specific unique machine attribute data tied to a specific computerized system. The plurality of authenticating servers further utilizing the Zero Knowledge Proofs to ensure that the servers in a group are authorized to have access to the Blockchain containing the Hybrid Non-Fungible Tokens. The invention further includes an Ethereum Blockchain distributed on the plurality of authenticating servers.

10 Claims, 7 Drawing Sheets

(56) References Cited

U.S. PATENT DOCUMENTS

| | | | | |
|---|---|---|---|---|
| 2015/0215492 | A1 * | 7/2015 | De Vuono | G06F 21/31<br>382/100 |
| 2020/0396075 | A1 * | 12/2020 | Visegrady | H04L 9/3234 |
| 2021/0028939 | A1 | 1/2021 | Trevethan | |
| 2021/0133700 | A1 | 5/2021 | Williams et al. | |
| 2021/0256070 | A1 | 8/2021 | Tran et al. | |
| 2023/0326291 | A1 * | 10/2023 | Gupta | G06Q 40/12<br>463/25 |
| 2023/0410072 | A1 * | 12/2023 | Perna | G06Q 30/018 |
| 2024/0070306 | A1 * | 2/2024 | Jurat | G06F 21/1015 |

OTHER PUBLICATIONS

Best Tool to perform steganography [updated 2020] Pavitra Shankhar, INFOSEC, 14 page(s), Jul. 8, 2020.
Email Correspondance with Examiner Sep. 2025 to Jan. 2026.

* cited by examiner

PLATFORM FOR CREATING AND USING A HYBRID NON-FUNGIBLE TOKEN BLOCKCHAIN SYSTEM

FIELD OF INVENTION

The ability to verify the identity of a counterpart in an internet transaction has become risky. Fundamental flaws within computer security technology, specifically Identity Management Systems (IMS), are the root cause of vulnerabilities across the entire cyber environment. Currently internet fraud costs the US Economy annually over a billion dollars. The Implementation of a system that can require identity verification for internet transactions will reduce internet fraud, financial crime, including credit card fraud, bank fraud, title fraud, tax fraud and identity theft. The current methods in the art, rely on documents that can be fraudulently obtained or made counterfeit. Further, personal information such as a mother's family name or a driver's license number, or a social security number along with an individual's birthdate, if unintentionally disclosed to a malicious party, can result in identity theft. Even the disclosure of a credit card information such as the current expiration date, can result in the bank that issued the card to have to issue a new credit card with a different credit card number.

Recently, the development of Non-Fungible Token (NFT) Blockchain Systems have provided a method to create digital art that is wholly unique and therefore unrepeatable, as a result the recent sale of digital art works has increased, with collectors wanting the original image. NFTs have been designed to provide a file that cannot be duplicated easily; The ownership of a work (a specific image file), can now be unique, while still allowing the originator to retain copyright (s) and the right to sell copies. To put it in terms of art collecting: anyone can buy a Van Gogh print, however only one person can own the original painting. NFT's use a system called Ethereum Blockchain(s). Non-Fungible means the item is unique and therefore cannot easily be replaced.

A non-fungible token (NFT) is sometimes used as a financial security consisting of digital data stored in a Blockchain, which is a form of distributed ledger; Specifically a Blockchain can be defined as a peer-to-peer, distributed ledger that is secured using cryptographic functions, specifically public key encryption, further the Blockchain is append only, meaning it can only be added to and previous entries cannot be modified easily, further the previous entries in the Blockchain are in a time sequential order, and except in very specific circumstances cannot be changed; More specifically the Blockchain can only be modified by consensus/agreement among peers in the Blockchain. The ownership of an NFT is recorded in the blockchain, and can be transferred by the owner, allowing NFTs to be sold and traded. NFTs typically contain references to digital files such as photos, videos, and audio/music. Because NFTs are uniquely identifiable, they differ from cryptocurrencies, which are fungible (changeable). The market value of an NFT is associated with the digital file it references.

There is a need in the computer security art(s) to provide a mechanism, which provides verification of an entity (or person), in any transaction, that the entity performing a transaction is a trusted persona/entity that has been verified and validated and not a malicious actor (bad actor).

BRIEF SUMMARY OF THE INVENTION

There are fundamental flaws in current identity management systems, the present invention provides an improved method, system, and computer program product, that when implemented using Block Chain Technology, will provide a Hybrid Non-Fungible Token. By fusing unique personal data and forensic science technologies, a Hybrid Non-Fungible Token can be created in an Ethereum Block chain system and thus render the ability to commit fraud over the internet extremely difficult, if not impossible. The proposed CHKID™ TOKEN (Chainsaw Identity Token) resolves the legacy flaws of prior art identity management systems by fusing data and forensic science technologies to create a Hybrid Non-Fungible Token (HNFT) which includes ether machine specific data, i.e. serial numbers or unique identity machine specific data, for example the serial number of a memory module (stick) or an IP address of a specific computer, or the hardware MAC address of the Network Interface Adapter. Further when continuing up the security hierarchy, the invention includes specific biometric data tied to a specific individual, including Facial Recognition data, Fingerprint Scan, DNA data, Retina Scan, voice recognition data all fused into a unique forensic data structure that is hashed into the Hybrid Non-Fungible Token (HNFT), further the unique data can be stored into a media file, using a methodology known as Steganography, making the resultant "digital hash" difficult to not only spoof but limit detection as well.

The Hybrid Non-Fungible Tokens (HNFT) blockchain system as being claimed, has a hierarchy, which currently consists of three levels, the lowest level of the Hybrid Non-Fungible Token, is created using an individual computing devices unique machine attributes, the other two levels of Hybrid Non-Fungible Token creation include information such as state issued photo ID's, such as Driver Licenses, Passport(s), Fingerprints, DNA or other such personally identifiable information that matches a specific individual (human). The higher the Token is in the hierarchy the greater the degree of trust will be authorized. Conversely the lower in the hierarchy the lower the level of trust will be granted into the system. During the generating process for creating the Hybrid Non-Fungible Token the Token data is fused into the HNFT with data that is associated with Personal Identification Information (PII), information that will be translated into a cryptographic hash, which is then stored with the Non-Fungible Token in the Block Chain. and as such will be tied to an individual or a specific computing machine. The ability to provide an individual cyber presence that is robust and cryptographically impossible to spoof and thus provide a way to ensure compliance with both public and government standards including Know Your Customer (KYC) requirements as well as Anti Money Laundering (AML) requirements is thus provided.

CHKID™ is a trademark for the Hybrid NFT Token System. With the HNFT system or CHKID™ system, a service is provided to a customer that unlocks the potential to ensure trust and nonrepudiation, boosting the return on investment of any business transaction, further CHKID™ provides a bespoke identity Management service to address fraud and offers best of breed web 3.0 paradigms and further provides a seamless service, and thus uncomplicating the integration of a blockchain into a customer's business or to a government ecosystem.

CHKID™ reduces risk of fraud by ensuring the identity of a party to a transaction, this is accomplished by independent verification and cannot be manipulated. The customers' information, which is referred to as (Personally Identifiable Information) or PII and is encrypted and done so end-to-end with public Key Encryption. Once a customer becomes part of CHKID™ system their identity credentials are minted (generated) onto their NFT (Non-Fungible Token CHKID™ TOKEN (Hybrid NFT) providing them (the customer) with a trusted NFT Identity; Further the minting service also provides IDaas (Identity Management as a Service), which is a layer 2 blockchain protocol that enables identity verification and validation. CHKID™ allows the customer (user) to define and prove, identify and establish verification and validation in a Hybrid NFT Blockchain system of an individual entity during a transaction.

DETAILED DESCRIPTION OF THE INVENTION

Figure 1:
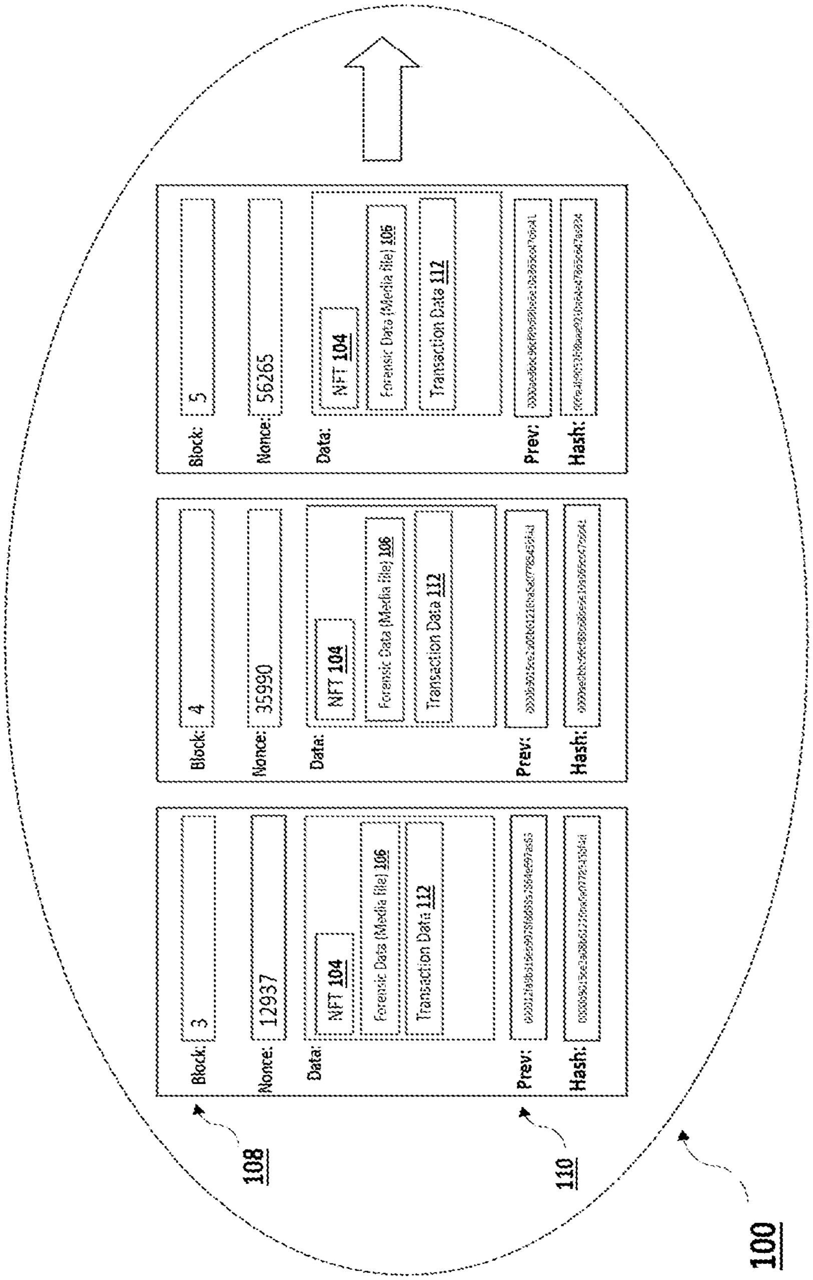
FIG. 1 is a diagram of a Block Chain as an embodiment of the present invention.
Figure 2:
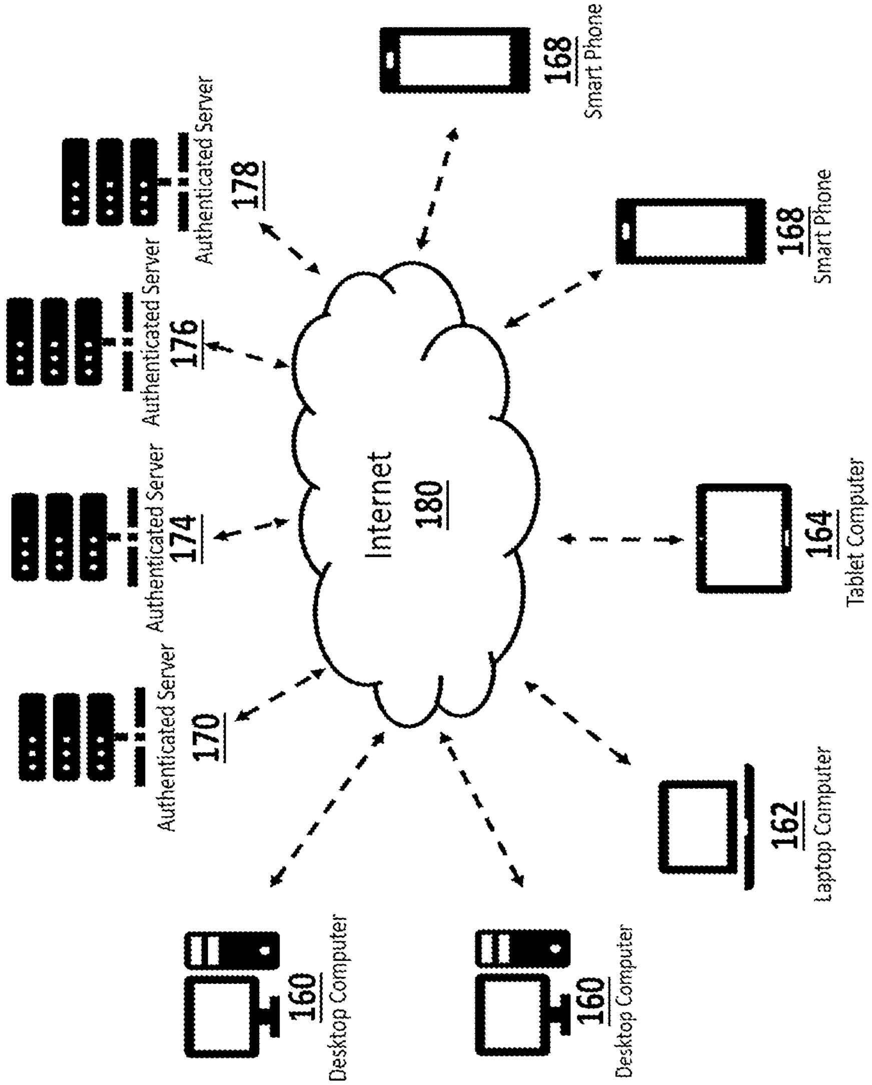
FIG. 2 discloses an embodiment of the operating Network and Computerized environment of the invention.
Figure 3:
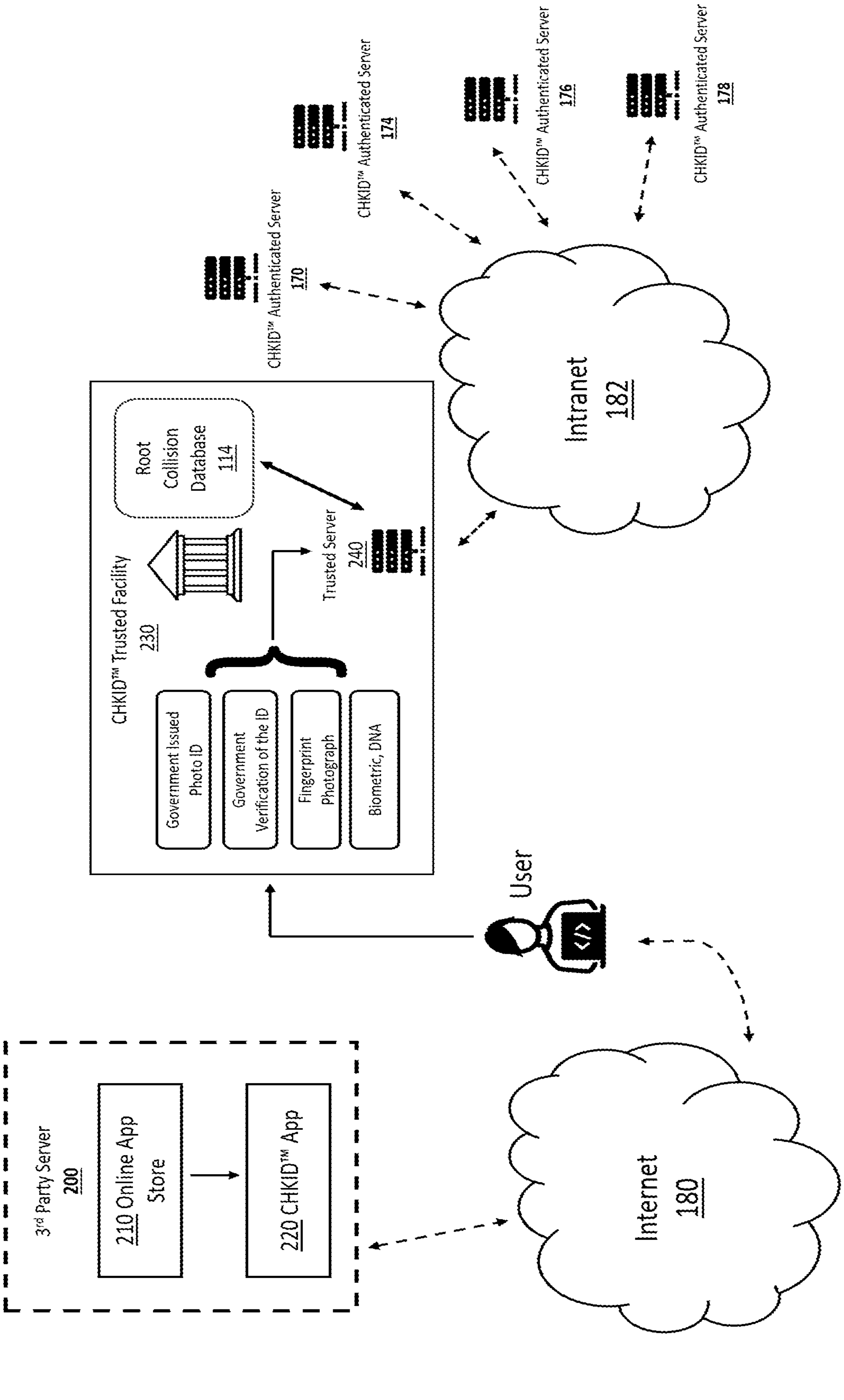
FIG. 3 is a diagram of the computerized environment required to Mint or generate a Hybrid NFT.

The computerized method, system and computer program product of the invention will require generating a Hybrid Non-Fungible Token (HNFT), in a processing system which contains a memory, comprising the following computational steps; generating a Blockchain Genesis Block and a Non-Fungible Token (NFT), the processing system comprising; at least a plurality of processing units (servers or individual workstations or a multiple of processors in a multiprocessor microprocessor integrated circuit); the processing units being hosted on a network, the network of processing systems having a protected Non-Fungible Token Naming Service (NNS) this network of systems or servers will comprise a group of computers (or processing systems) that contain verified and validated systems (servers) that are part of a group of servers, the servers utilizing Zero Knowledge Proofs (ZKPs) to Verify and Validate that said servers are valid for processing the unique Hybrid Non-Fungible Tokens. The computerized method further comprises; wherein said Unique Cybernetic Data (UCD) includes a plurality of unique computing system attributes including; computer serial number, a memory device serial number, a MAC address of a network controller, the IP address of the host computer system and further including unique computer configuration data including; CPU type and/or UUID System Board Serial Number. The computerized method further comprising; wherein said Personal Identification Data (PIDs) comprises at least a plurality of the following; Credit Report, Arrest or Criminal Record, a Valid State issued Photo ID, a Valid State Issued Passport, a Valid Birth Certificate with a raised seal or any other State Issued document that has been Validated. The computerized method further comprising the cryptographic hash is generated using the SHA-0, SHA-1, SHA-2, SHA-3, RIPEMD or Whirlpool hash algorithms. The computerized method further comprising; the Personal Identifiable Information (PII) is scanned into a computer and held in a computer memory uses an encoding scheme that generates a digital image file and is then cryptographically hashed and held in the Genisis Block of the Block Chain.

The computerized method, system and computer program product further comprising; generating a forensic cryptographic hash, derived from a collection step comprising collecting Personal Identifiable Information (PII), said PII comprising a plurality of forensic elements collected by contact with an individual or an individual's computational device, in a Validated and Verified data collection facility or Validated and Verified network; where biometric data is collected or Personal Identification Data (PID) is collected or a collection of Unique Cybernetic Data (UCD) tied to a specific individual's computational device is collected from an individual or said individual's computational device, and a forensic cryptographic hash is generated and held in a computer memory of a server, wherein said server and computational device are Verified and Validated using the (NFT Naming Service) NNS; The method further comprising, generating and holding in a computer memory the forensic cryptographic hash generated using the Personal Identifiable Information (PII) and further combining said cryptographic hash with the Non-Fungible Token (NFT) to generate the Genesis Block in a Block Chain thereby generating the Hybrid Non-Fungible Token. The computerized method further comprising; the biometric data comprises at least a plurality of the following; a fingerprint, a photograph, a DNA sample, physical height, a birthdate, The NFT Naming Service (NNS), provides the list of the plurality of verified and validated servers 170, 174, 176, 178 or systems in the "trusted" domain to facilitate Zero Knowledge Trust (ZKT). The ZKT is an implementation of the concept known as ZKP or Zero-Knowledge Proofs which were introduced by Goldwasser, Micali, and Rackoff in 1985. These proofs are used to prove the validity of an assertion without revealing any information whatsoever about the assertion. There are three properties of ZPKs that are required: completeness, soundness, and the zero-knowledge property. In general, the zero-knowledge proof may include logical proof indicative of a prover knowing or having access to a secret without revealing the secret. The zero-knowledge proof includes information that, when evaluated, proves to a verifier that a particular statement is true, without revealing any information except the validity of the statement. In an example, a hash function may generate a hash of a random number. A zero-knowledge proof may prove, to a verifier, that the prover has access to the random number, without revealing the random number. For example, the zero-knowledge proof may prove that the validated server in the NFT NS has been verified as a legitimate repository of the Blockchain for the Hybrid NFT. The zero-knowledge proof may prove that the selected Hybrid NFT exists on the blockchain 100 and the selected Hybrid NFT is not retired. The zero-knowledge proof may prove that the public key of the selected Hybrid NFT corresponds to the private key of the Verified Server.

Alternatively or in addition, another example of a technical advancement achieved by the systems and method described below may be that a zero-knowledge proof included in the Hybrid NFT minting (or generating) process, may provide a certification that a server provided in the trusted NFT Naming service, is a participant of the distributed ledger network ensuring that when the Minting (generating) of a new Hybrid NFT is being performed on the Blockchain that the server being used is verified as one of the members of the certified Blockchain hosts. The source/sender blockchain for the source/sender NFT name service network and the receiver blockchain for the receive Hybrid NFT network may each store a smart contract. The smart contract of each blockchain may verify the zero-knowledge proof included in the exchange instruction as a precondition to performing the Hybrid NFT minting or generation. The zero-knowledge proof may include, for example, a non-interactive zero-knowledge proof such as a Zero-Knowledge Succinct Non-Interactive Argument of Knowledge (zk-SNARK). In such cases, the zero-knowledge proof may be verified without performing additional communications with the Host Server and/or the individual entity that is to become the participant in the Hybrid NFT network. Accordingly, the processing times and computing resources involved in generating a HYBRID NFT persona may be reduced because less verification messages are sent between the host minting the Hybrid NFT and the existing Hybrid NFT Blockchain network.

Further and in addition the preferred embodiment, includes a software application will be downloaded from any number of a plurality of application stores available, such as Apple™ App Store or the Google™ Play App Store 210 or any number of on-line App stores or be able to utilize a texting application for example, WHATSAPP™ or the SIGNAL™ App or the like, further the claimed technology is technology agnostic and utilizes a decentralized application which is used to provide the end user with access to the Mint (Server 170) to generate the initial Hybrid NFT. The User can access a server 200 on the Internet, which provides an online App Store 210 from which the Hybrid NFT APP 220 can purchased and downloaded. The Hybrid NFT and APP 220 will act as a wallet for transactions, the CHKID™-NFT DAPP or (CHKID™-NFT Decentralized APPlication) utilization of the "App" is where the customer (user) will register up to twelve Multi-Factor Attributes (MFA), also referred to in this Application as Forensic data 106, which will determine the security level of the user/customer. Further, the Hybrid NFT will embed the MFA using a technique known as Steganography. This methodology is used to hide secret messages in computer files, in the preferred embodiment the claimed invention uses Steganography to hide a unique identifier or hash value in an image file. The image file can be a BMP or JPEG image file, in alternative embodiments the file could be a Sound or wave file or an MP5 video file, further the use of HTML, DOC or DOCX files can be utilized in alternative embodiments. The use of Steganography as well as the hashing requirements of the steps involved in generating the Hybrid NFT, require computationally intensive resources, the claimed methodology is tied to a computing machine(s), more specifically, a computer, with a multiprocessor core 301 including a memory system 302 which has at least a gigabyte of memory. In alternative embodiments, smaller footprint versions of the claimed computerized method and system could be utilized on smaller footprint systems, meaning not requiring a multicore processing system or at least a gigabyte of memory. At the consumer end a smartphone 168 would have the necessary computing resources to utilize this methodology for the use of e-commerce and confirmation of an online entity. Further a Tablet computer 164 or a laptop computer 162 or Desktop Computers 160 could be utilized with the embodiments of the invention.

A trust Hierarchy will involve at least three "bands" or "zones" of trust. The lowest band of trust will comprise machine attributes tied to a specific computational device, more specifically; computer serial number, a memory device serial number an CPU type, UUID System Board Serial Number, a MAC address (Ethernet Address), a type of processor, a specific hardware configuration, including memory size and/or storage type and the storage capacity of said storage type, the simcard data from a cellular telephone or smart phone, including a Cell Phone Hardware ID, a Cell Phone GEOIP or a CELL PHONE IMEI (HASH) value; the second band or zone would require an applicant to the system to go to a Trusted Facility, like a consular office or a postal office or Department of Motor Vehicles (DMV) office or any trusted Government or private facility, including financial Institutions where specific types of document would be required, including but not limited to a State Issued Photo ID, more specifically a Drivers License or a Passport, a Bank Deposit record or a Birth Certificate with a Raised seal, or a TSA PreCheck® indicator (such as TSAPRECHK, TSA PRE, or TSA PreCheck®), which can be verified by the TSA; or an arrest record or credit report; and the top "band" or "zone" of trust factors would be biometric trust factors such as, Facial Recognition, Retina Scan, Voice Print, Finger Print, Blood Type and/or a DNA sample. The Government issued identification documents could be verified at a Government Facility 230 said Government Facility containing a secure Government Server 240 communicatively connected to the "MINT" Authenticated Server 170.

CHKID™ is being used as a trademark for the invention. In the preferred embodiment, there are a plurality of CHKID™ Authenticated Server servers, that will be available on the internet 180, that will be auctioned off for a fee, this is provided so that the owner of a specific CHKID™ server, will be incentivized to not allow or permit "Bad Actors" to participate in the Block Chain system. The Blockchain contains various fail-safe mechanisms, a Vital mechanism to remove the ability to make false duplicate Hybrid Non-Fungible Tokens is the inclusion of a Root Collision Database 114 which provides a mechanism that determines if a false or malicious Block is being introduced into the Blockchain. Each block contains a special Hash Value 110, this value is unique to each Block starting with the Genisis Block. Without specific information regarding the updated Block Chain Values when new transactions take place, it is a cryptological impossibility to introduce a false Block into the Block Chain. When one of the Ethereum Blockchains 100 on one of the CHKID™ Authenticated Servers generates a new Block on the Blockchain 100 due to a new transaction, all the copies of the Ethereum Blockchain on the different CHKID™ Family of Authenticated Servers are updated. If one of the trusted servers were to permit a spoofed or fake blockchain block to be appended to a particular blockchain used by a specific user account then during an update cycle, the other trusted servers would no longer allow the offending server to stay in the CHKID™ family. The offending server attempting to spoof the Blockchain system would be removed from the "trusted domain" and the NFT name service; Thus, any attempt to subvert the security of the CHKID™ system would fail. The CHKID™ Authentication Servers 170, 174, 176, 178 will each contain a copy of the CHKID™ Ethereum based Blockchain 100, which will contain the NFT 104 the Forensic Data 106 and the Transaction data 112 for each individual transaction and each individual entity, within each block, there will also be a nonce 108. Further on a media file included in the Hybrid NFT Forensic Data is a media file 106 in which is embedded a secret value based upon the PII or MFA data, using a method known as Steganography, the Forensic data is embedded in the media file. In the preferred embodiment the media file is an image file or JPEG file. CHKID's users can create multiple personas with public/private key pairings provided by the Hybrid NFT which contains the MFA attributes. For a given entity, the MFA attributes are nested, then encrypted with a public key. A user's public key is provided to decrypt the identity information for a given transaction without disclosing the specific MFA data. The transaction request goes to one of the CHKID™ Authenticated Servers first 170, 174, 176 or 178 and remains on the public side of the CHKID™ Authenticated Server to protect the private Personally Identifiable Information or (PII) of the Hybrid NFT Multi Factor Authorization. All Personally Identifiable Information traverses the CHKID™ system in a cryptographically secure form. Considering the party's trust level in the trusted Hierarchy, or "Bands or Zones" of trust, CHKID™ takes those predetermined trust attributes MFA's and logically ANDs them with the nonce 108, and then generates a unique salt 330 which is generated for each transaction. The salt 330 is a unique hash value providing nonrepudiation and independent verification of the transaction. All public facing data is cryptographically hashed and with a specific and unique salt for each transaction. Third party independent verification is integrated into CHKID™ via a challenge/response mechanism which is a secure challenge-handshake authentication protocol (CHAP). Only computers 320 and specific users can cryptographically provide the proper hash, which requires possession of the specific Hybrid NFT, for a specific user account to be able to verify a communication with any of the CHKID™ Authenticated Server(s) 170, 174, 176 or 178. For each transaction a unique Salt 330 is generated. The unique Salt 330 is exchanged with the initial encrypted frame or packet during the transaction and the resultant Salt value is compared, both on the Users Computer 320 as well as the E-Commerce Web Server 300. If the unique Salt 330 value is the same, then the two entities are verified as being authenticated.

Additional servers, which are operated by individual business and/or Government entities, for example, Amazon™ or EBay™ or the Federal Government USPTO, or Treasury as example embodiments, will purchase Unique Hybrid NFT's as authenticated entities and then be able to authenticate a user, or user(s) as being a trusted partner(s), when performing tasks electronically. Each of the entities that participate in the CHKID™ system will each be licensed by the system and received a unique Hybrid NFT, in this manner they will participate in the Authentication Eco System and further will maintain a copy of the NFT Ethereum Block Chain. The Hybrid NFT CHKID™ Ethereum Blockchain 100 will be distributed across the Authenticated Servers as well as the MINT/CHKID™ Authentication Server 170. During the minting process, when the Genisis Block is created for the original Hybrid NFT, the transaction occurs on an dedicated network or Intranet 182 which only the CHKID™ Authenticated Servers have access to. One of the Authentication Servers 170 is the MINT server. The other Authentication Servers 174, 176 and 178 represent a plurality of servers which will quickly exceed the listed number of servers, which are listed as 4 servers only for illustrative purposes. As the system develops and more entities, commercial as well as Governmental, acquire a license to practice the invention, the number of Authentication servers and machines with a copy of the Block Chain will increase by the thousands.

The system circuitry may include a processor or multiple processors 301; the system logic will include memory 302. Further the preferred embodiment of a computer hardware could include a Graphics Processor Unit 304 as well as a Display 308 the display could be embodied as a any of the following: CRT Monitor, LCD Monitor, TFT Monitor, LED Monitor, Touchscreen Monitor, Plasma Screen Monitor, OLED Monitor, as well as item 326. The processor 301 will be communicably coupled with the memory 302. In one example embodiment, the processor may also be in communication with additional elements, such as the communication interfaces and/or the input interfaces. Examples of the processor may include a general processor, a central processing unit, a microcontroller, a server, an application specific integrated circuit (ASIC), a digital signal processor, a field programmable gate array (FPGA), and/or a digital circuit, analog circuit, or some combination thereof; and may further include a multi-processor containing multiple processor cores as well as a physics processor, a general processor (GPU) and a graphics processor 304, on the same silicon substrate or wafer 322. Further the claimed computing system could be a quantum processor or an array of quantum processors. The claimed processor/processors/processing systems may be a System on a Chip (SOC) 322 including embedded non-transitory memories 302 and a functioning bus, on the SOC 322. The computing environment may also include a Network controller 305, as well as a serial controller 306 which could embody a USB port or ports with a variety of connectors, including but not limited to; USB-A, USB-B, Mini-USB, Micro-USB, USB-C, and/or USB-3 or any future high speed smart serial connector or type. The computing environment, including Laptop Computers 162, Desktop computers 160, Smartphones 168, Computing Tablets 164, or ALL-IN-ONE computers, includes a peripheral controller 303 for various input devices. Further the computing environment could further include a BUS controller 307 for various high speed, high performance Computer BUS architectures, example embodiments might include PCI and PCI-X. The PCI bus can operate at 32-bit 33 MHz, 32-bit 66 MHz, 64-bit 33 MHz, and 64-bit 66 MHz. whereas the PCI-X can operate at 66, 133, 266, 533, and 1066 MHZ, further the embodiments can include processor direct slots as well as PCIe slots and cards: ×1, ×2, ×4, ×8, and ×16 further the BUS could include PCI Express and/or an AGP slot. As regards more portable computing devices such as a Smartphone 168 and a Tablet computer 164 they could include a Radio with a processor and a communications Operating System 324 as well a Peripheral connector 328, such as connections to various memory devices, such as simms (single in-line memory modules). Further the SmartPhone 168 and the Tablet Computer 164 could be Cellular telephones which can wirelessly communicate via 5G 4G and 3G. Other Wireless protocols could include, RFID, Z-Wave, NFC and the like.

The processor/processors may be one or more devices operable to execute logic. The logic may include computer executable instructions or computer code stored in a memory 302 or in other non-transitory memory that is commutatively coupled to the processor/processors 301, 322 and when executed by the processor/processors, will cause the processor/processors to perform the features implemented by the logic of the NFT Domain Servers, the Net Stored Hashed Database, the Hybrid NFT blockchain, the Post Office Hybrid NFT Mint. The computer code may include instructions executable by processor and or processors.

The memory may be a device for storing and retrieving data or any combination thereof. The memory may include non-volatile and/or volatile memory, such as a random-access memory (RAM), a read-only memory (ROM), an erasable programmable read-only memory (EPROM), flash memory, or Solid State Disk Drive (SSD). Alternatively, or in addition, the memory may include an optical, magnetic (hard drive) or any other form of data storage device. The non-transitory memory may include one or more other components or subcomponents previously discussed and/or other components of the system described herein.

The system may be implemented in many ways. For example, the components of the system may be hardware or a combination of hardware and software. For example, each component may include an application specific integrated circuit (ASIC), a Field Programmable Gate Array (FPGA), a digital logic circuit, a combination of discrete circuits, gates, or any other type of hardware or combination thereof. Alternatively, or in addition, each component may include memory hardware, such as a portion of the memory, for example, that comprises instructions executable with the processor/processors or other processor to implement one or more of the features of the circuitry. When any one of the components includes the portion of the memory that comprises instructions executable with the processor/processors, the component may or may not include the processor. In some examples, each component may just be the portion of the memory or other physical memory that comprises instructions executable with the processor or other processor to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of non-transitory computer readable storage media. Examples of the non-transitory computer readable storage medium may include a hard disk, a floppy disk, a CD-ROM, a flash drive, a cache, volatile memory, non-volatile memory, RAM, flash memory, optical memory, bubble memory, a thumb drive, USB storage module or any other type of non-transitory computer readable storage medium or storage media. The computer readable storage medium may include any type of non-transitory computer readable medium, such as a CD-ROM, a volatile memory, a non-volatile memory, ROM, RAM, Solid State Disk Drive (SSD) or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other non-transitory computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines or a wireless network, including WiFi networks or Bluetooth implementations. In yet other examples, the logic or instructions are stored within a given computer, central processing unit ("CPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other types of circuits or logic. Similarly, memories may be DRAM, SRAM, Flash, Solid State Disk Drive, or USB Stick memory device or any other type of memory. Flags, data, databases, tables, entities, and other data structures may be separately stored and managed, may be incorporated into a single memory or database, may be distributed, or may be logically and physically organized in many ways. The components may operate independently or be part of the same apparatus executing the same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

The invention will further be implemented by computer executable instructions embodied on a non-transitory computer readable media that when executed performs the following method steps; 600 generating a Blockchain Genesis Block and a Non-Fungible Token (NFT), the processing system comprising; at least a plurality of processing units; the processing units being hosted on a network, the network of processing systems having a protected Non-Fungible Token Naming Service (NNS), the service utilizing Zero Knowledge Proofs (ZKPs) to Verify and Validate the networked processing systems; 602 generating a forensic cryptographic hash, derived from a collection step comprising collecting Personal Identifiable Information (PII), said PII comprising a plurality of forensic elements collected by contact with an individual or an individual's computational device, in a Validated and Verified data collection facility or Validated and Verified network; where 604 biometric data is collected or Personal Identification Data (PID) is collected or a collection of Unique Cybernetic Data (UCD) tied to a specific individual's computational device is collected from an individual or said individual's computational device, and a forensic cryptographic hash is generated and held in a computer memory of a server, wherein said server and computational device are Verified and Validated using the NNS; 606 generating and holding in a computer memory the forensic cryptographic hash generated using the Personal Identifiable Information (PII) and further combining said cryptographic hash with the Non-Fungible Token (NFT) to generate the Genesis Block in a Block Chain thereby generating the Hybrid Non-Fungible Token. Further the biometric data comprises at least a plurality of the following; a fingerprint, a photograph, a DNA sample, physical height, a birthdate, or a retina scan. Further wherein said Unique Cybernetic Data (UCD) includes a plurality of unique computing system attributes including; computer serial number, a memory device serial number, a MAC address of a network controller, and further including unique computer configuration data including; CPU type, UUID System Board Serial Number. Further, the Unique Cybernetic Data (UCD) includes a Cell Phone Hardware ID, a Cell Phone GEOIP or a CELL PHONE IMEI (HASH) value. Further, Personal Identification Data (PIDs) comprises at least a plurality of the following; Credit Report, Arrest or Criminal Record, a Valid State issued Photo ID, a Valid State Issued Passport, a Valid Birth Certificate with a raised seal or any other State Issued document that has been Validated. Further, the cryptographic hash is generated using the SHA-0, SHA-1, SHA-2, SHA-3, RIPEMD or Whirlpool hash algorithms. Further, the Personal Identifiable Information (PII) is scanned into a computer and held in a computer memory using an encoding scheme that generates a media file and is then cryptographically hashed and held in the Genisis Block of the Block Chain. Further, the forensic cryptographic hash is encoded into the digital media format which can be anyone of the following plurality of digital media file formats, including but not limited to JPEG or jpg, bmp or bitmap, wmf or Windows Metafile, tiff or Tag Image File Format, gif or graphics Interchange Format or an audio file format including but not limited to WAF or Words And Figures Document file or mp3 moving pictures experts group file format or bwf Broadcast Wave Format or an Audio Interchange File Format (AIFF), or a video file format including but not limited to mp4 or MPEG-4 format, or a mov file format or Apple QuickTime Movie File Format or wmv or Windows Media Video file format or avi or Audio Video Interleave file format or any one of a collection of office productivity file formats including but not limited to the .doc format, the .docx format, the ppt file format, the pptx file format, xls file format or the xlsx file format, which are embedded using steganography.

Further another implementation of the claim methodology can be performed with computer instructions stored on a non-transitory computer readable media said instructions when loaded into a computing system and executed by a processor or plurality of processors over a network perform the following method steps; method of performing a verifiable secure network transaction; said network transaction using a block in a blockchain of hybrid nonfungible tokens, the computer-implemented method comprising; 702 processing a secure computerized transaction, over a computer network, using at least a plurality of processor(s), generating an encrypted tunnel between a computer performing a transaction and a verified and validated server; said verified and validated server, communicating over the computer network, said verified and validated server and the computer both providing a layer two verification and validation service, said verification and validation service utilizing a zero-knowledge lookup; 704 said verified and validated server and said computer negotiating a trust level based upon a trust level determined during a generation step when creating a hybrid non-fungible token specifically tied to a specific entity which is embodied on said computer; 706 computationally processing a hybrid non-fungible token from a block in a blockchain, said blockchain including unique forensic identification data; said block in the block chain further including a hybrid nonfungible token and a unique nounce value in a particular block; 708 generating, on both the computer and the verified and validated server, a salt value using said unique nounce value and said hybrid non-fungible taken forensic identification data and using the current date and time data to then generate a unique salt value; 710 the computer and the verified and validated server exchange the unique salt value that has been generated locally and independently on both the computer and the verified and validated server, via the encrypted tunnel; 712 the computer compares the salt value received from the verified and validated server, the verified and validated server compares the salt value received from the computer; 714 the salt values are equal and the computer and verified and validated server perform a verified secure network transaction. 716 further including, said blockchain is an Ethereum block chain. Further including, said zero-knowledge lookup is a (Zero-Knowledge Succinct Non-Interactive Argument of Knowledge) or ZK-SNARK and said verified secure network transaction is verified as valid with a ZK-SNARK proof. Further including, the encrypted tunnel is based upon a secure socket layer security protocol including a digital certificate issued by a certificate authority. Further including, the negotiated trust level has three bands of security, band one comprising unique machine identification attributes, the second comprising trusted and verified state issued documents, including a photo identification, and the third including biometric data based on biological samples from a specific individual. Further including, unique forensic identification data is stored in a JPEG media file in the hybrid nonfungible token using a method called Steganography.

Figure 4:
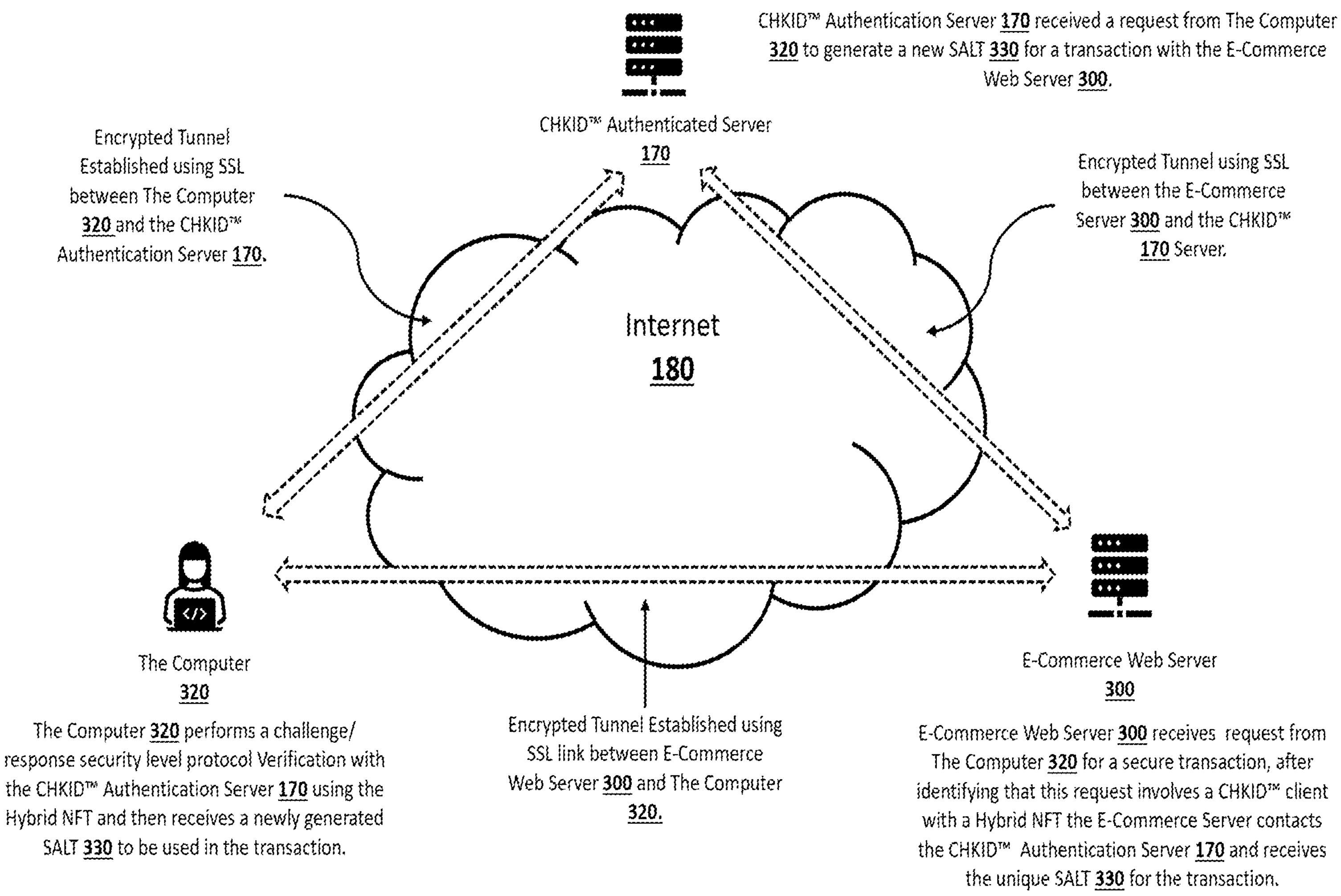
FIG. 4 discloses a network transaction between an E-Commerce server a user (with a computer) and the CHKID™ Authenticated Server.
Figure 5:
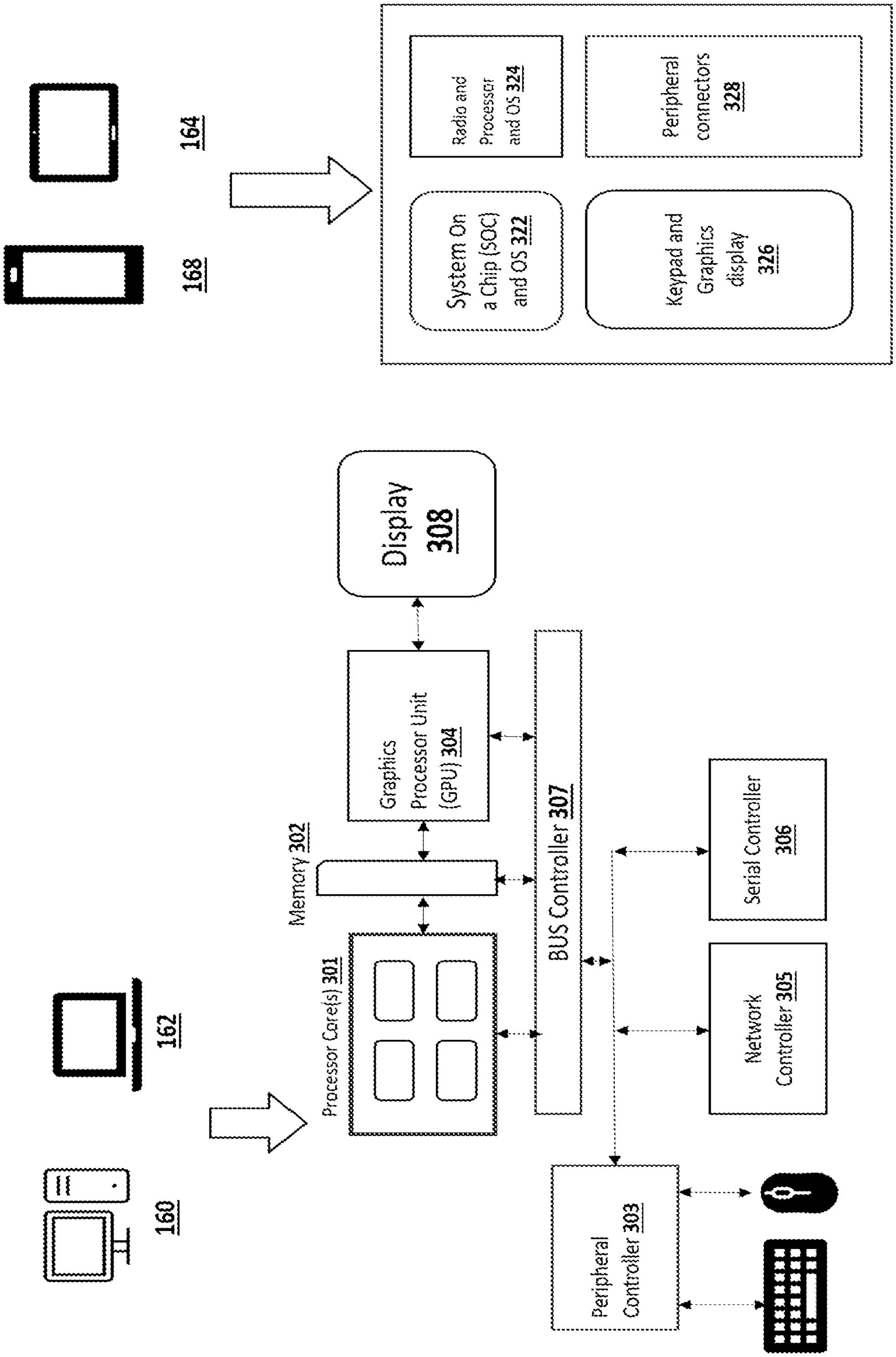
FIG. 5 discloses examples of "the computer".
Figure 6:
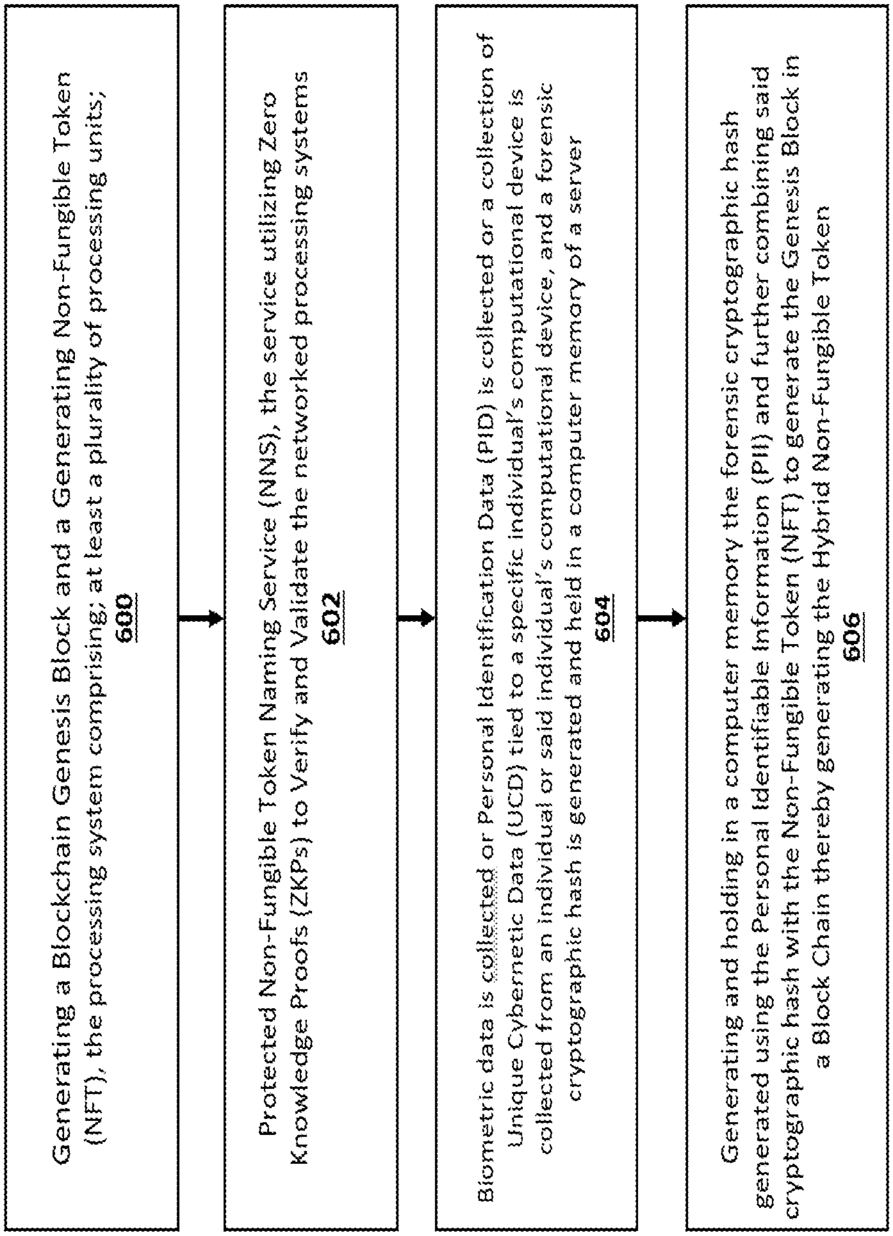
FIG. 6 is a flow chart of the process of "minting" a Hybrid NFT.
Figure 7:
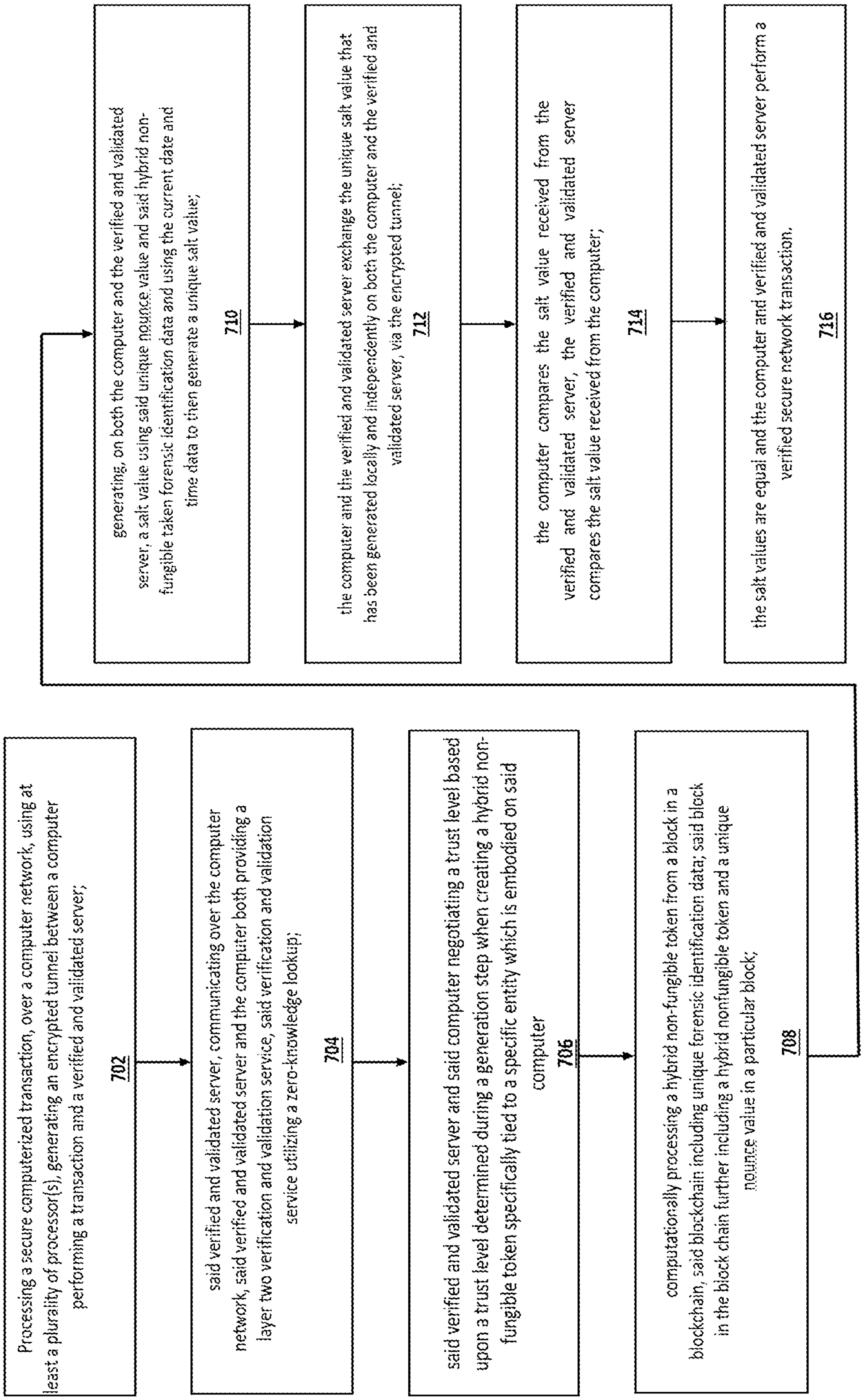
FIG. 7 is a flow chart of a transaction wherein a User or Device is Authenticated and validated.

Looking to FIG. 4 the CHKID™ Authentication Server 170 instigates an encrypted tunnel 300 between the Computer 320 and an E-Commerce Web Server 300 using the SSL methodology after a request for Authentication, utilizing the Hybrid NFT technology is received from the E-Commerce Web Server 300 to the CHKID™ Authentication Server 170. In doing so a request for authentication using the Hybrid NFT. The Challenge/Response protocol is initiated and a newly generated SALT value 330 is created. The CHKID™ Authentication Server 170 generates the Salt Value 330 using the Hybrid NFT that is identified with the particular Computer 320 based on the security level assigned to that particular individual initiating the Authentication request. Only a computer that has access to the correct Hybrid NFT has the ability to generate the correct nounce value that is then used to generate the unique Salt Value which in embodiments is also based on time stamps. The E-Commerce Server 300 having access to the Block Chain will locally generate the SALT value, the CHKID™ Authentication Server also having access to the block chain will locally generate the Salt Value, both the E-Commerce Server and the CHKID™ Authentication server will compare the locally generated SALT value with the SALT value provided by the Computer 320. If the correct value is determined, then the individual utilizing the Computer 320 has been Validated and the transaction will proceed. In this manner the E-Commerce Server has high confidence that the transaction is with the customer as represented and therefore will lower the ability of "Bad Players" to break the system and perform fraudulent transactions.

The following patent(s) and patent publication(s) are hereby incorporated by reference, U.S. Pat. No. 11,182,467 to Medina Issued on Nov. 23, 2021 as to a teaching of a Non-Fungible Token, U.S. Pat. No. 11,301,460 to Rich et al. Issued on Apr. 12, 2022 as to a teaching of Non-Fungible Tokens, US Patent Application Publication to TREVETHAN number US 2021/0028939 A1 Publication Date Jan. 28, 2021 as to a teaching of using Zero-Knowledge Proof, and US Patent Application Publication US 2021/0133700 A1 to Williams et al. Publication Date May 6, 2021 as to a teaching of Blockchains and Non-Fungible Tokens.

The foregoing description of the embodiments of the invention has been presented for the purpose of illustration; it is not intended to be exhaustive or to limit the invention to the precise forms or specific definitions as disclosed. The description and drawings are, accordingly, to be regarded in an illustrative rather than a restrictive sense. The language used in the specification has been selected for readability and instructional purposes. Therefore, the scope of the invention is not limited by this detailed description and drawings and further by the claim language as set forth. While example embodiments have been particularly shown and described, it will be understood by those skilled in the art that various changes in form and implementation details may be made without departing from the scope of the embodiments encompassed by the claim language as originally presented or amended.

What is claimed is:

1. A computerized method of generating a hybrid non-fungible token (HNFT) comprising:
- generating a blockchain genesis block and a non-fungible token (NFT);
- authenticating a server by utilizing a non-fungible token naming service (NNS), and utilizing a zero knowledge proof (ZKP) comprising a zero-knowledge succinct non-interactive argument of knowledge (zk-SNARK) to verify and validate said server, said server now being an authenticated server;
- generating a forensic cryptographic hash, derived from a collection step comprising collected personal identifiable information (PII), said PII comprising a plurality of forensic elements collected by contact with an individual in a trusted facility where biometric data is collected, and hashing the PII using a hash algorithm selected from the group consisting of SHA-0, SHA-1, SHA-2, SHA-3, SHA-256, RIPEMD, and Whirlpool;
- storing the forensic cryptographic hash in a computer memory of the authenticated server;
- encoding said forensic cryptographic hash into a digital media file using steganography and combining the encoded forensic cryptographic hash with the NFT, thereby generating the HNFT; and
- storing said HNFT in the genesis block of the blockchain for verifying subsequent secure network transactions.

2. The computerized method of claim 1 further comprising; wherein said biometric data comprises at least a plurality of the following; a fingerprint, a photograph, a DNA sample, physical height, a birthdate, facial recognition or a retina scan.

3. The computerized method of claim 1 further comprising; the digital media file is of a type comprising digital media file formats, including but not limited to jpg, bmp, wmf, tiff, gif or an audio file format including but not limited to wav, mp3, bwf, or an audio interchange file format (AIFF) or a video file format including but not limited to mp4, mov, wmv, avi or an office productivity file format(s) including but not limited to, doc, docx, ppt, pptx, xls, xlsx.

4. A computerized method for generating a hybrid non-fungible token (HNFT) comprising:
- generating a blockchain genesis block and a non-fungible token (NFT);
- authenticating a server by utilizing a non-fungible token naming service (NNS), and utilizing a zero knowledge proof (ZKP) comprising a zero-knowledge succinct non-interactive argument of knowledge (zk-SNARK) to verify and validate said server, said server now being an authenticated server;
- generating a forensic cryptographic hash, derived from a collection step comprising collecting unique cybernetic data (UCD) tied to a specific individual's computational device, and hashing the UCD using a hash algorithm selected from the group consisting of SHA-0, SHA-1, SHA-2, SHA-3, SHA-256, RIPEMD, and Whirlpool;
- storing the forensic cryptographic hash in a computer memory of the authenticated server;
- encoding said forensic cryptographic hash into a digital media file using steganography and combining the encoded forensic cryptographic hash with the NFT, thereby generating the HNFT; and
- storing said HNFT in the genesis block of the blockchain for verifying subsequent secure network transactions.

5. The computerized method of claim 4 further comprises; wherein said Unique Cybernetic Data (UCD) includes a plurality of unique computing system attributes including; computer serial number, a memory device serial number, a (Media Access Controller) MAC address of a network controller, and further including (Central Processing Unit) CPU type, (Universally Unique Identifier) UUID and a system board serial number.

6. The computerized method of claim 4 further comprising; the digital media file is of a type comprising digital media file formats, including but not limited to jpg, bmp, wmf, tiff, gif or an audio file format including but not limited to wav, mp3, bwf, or an audio interchange file format (AIFF) or a video file format including but not limited to mp4, mov, wmv, avi or an office productivity file format(s) including but not limited to, doc, docx, ppt, pptx, xls, xlsx.

7. The computerized method of claim 4 further comprises; wherein the Unique Cybernetic Data (UCD) includes a Cell Phone Hardware ID, or a Cell Phone (International Mobile Equipment Identity) IMEI (HASH) value.

8. A computerized method for generating a hybrid non-fungible token (HNFT) comprising:
- generating a blockchain genesis block and a non-fungible token (NFT);
- authenticating a server by utilizing a non-fungible token naming service (NNS), and utilizing a zero knowledge proof (ZKP) comprising a zero-knowledge succinct non-interactive argument of knowledge (zk-SNARK) to verify and validate said server, said server now being an authenticated server;
- generating a forensic cryptographic hash, derived from a collection step comprising collecting personal identifiable data (PID), said PID comprising a plurality of state issued documents collected by contact with an individual in a trusted facility where state issued document data is collected, and hashing the PID using a hash algorithm selected from the group consisting of SHA-0, SHA-1, SHA-2, SHA-3, SHA-256, RIPEMD, and Whirlpool;

storing the forensic cryptographic hash in a computer memory of the authenticated server;

encoding said forensic cryptographic hash into a digital media file using steganography and combining the encoded forensic cryptographic hash with the NFT, thereby generating the HNFT; and storing said HNFT in the genesis block of the blockchain for verifying subsequent secure network transactions.

9. The computerized method of claim 8, further comprising; wherein said PID includes at least a plurality of a valid driver's license, a valid state issued photo id, a valid birth certificate with a raised seal, an arrest record, a credit report or further including personally identifiable data (PID) from a credit report, valid passport or personal identifiable information including personal financial information.

10. The computerized method of claim 8, further comprising; the digital media file is of a type comprising digital media file formats, including but not limited to jpg, bmp, wmf, tiff, gif or an audio file format including but not limited to wav, mp3, bwf, or an audio interchange file format (AIFF) or a video file format including but not limited to mp4, mov, wmv, avi or an office productivity file format(s) including but not limited to, doc, docx, ppt, pptx, xls, xlsx.

* * * * *